W. & B. Douglas,
Force Pump.
Nº 19,834. Patented Apr. 6, 1858.
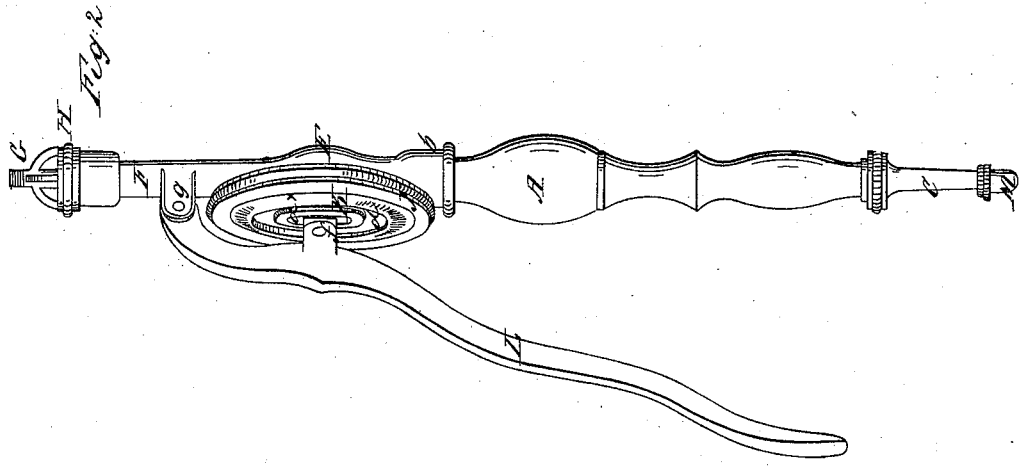
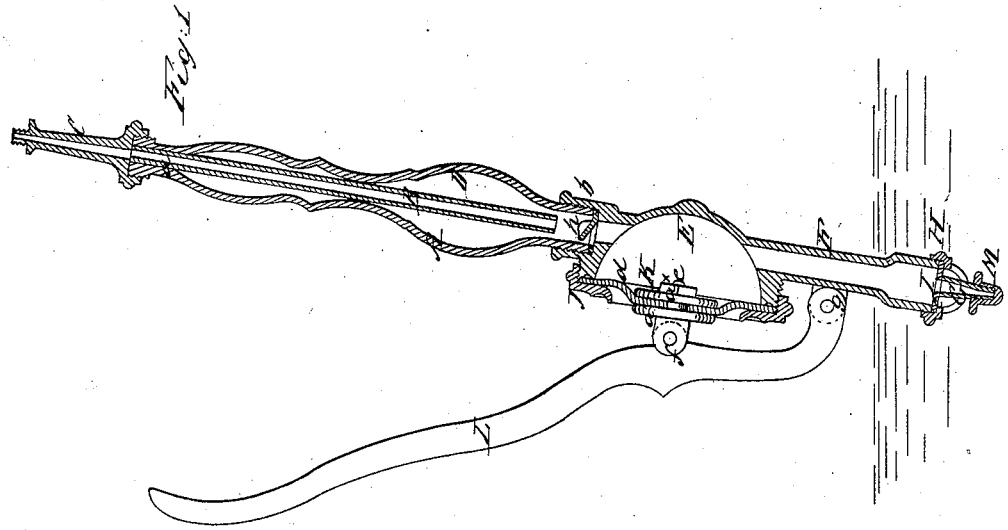
N. PETERS, PHOTO-LITHOGRAPHER, WASHINGTON, D. C.

UNITED STATES PATENT OFFICE.

W. DOUGLAS AND B. DOUGLAS, OF MIDDLETOWN, CONNECTICUT.

PORTABLE PUMP.

Specification of Letters Patent No. 19,834, dated April 6, 1858.

*To all whom it may concern:*

Be it known that we, W. DOUGLAS and B. DOUGLAS, both of Middletown, in the county of Middlesex and State of Connecticut, have invented a new and Improved Portable Pump; and we do hereby declare that the following is a full, clear, and exact description of the same, reference being had to the annexed drawings, making a part of this specification, in which—

Figure 1, is a longitudinal central section of our improvement. Fig. 2, is an external view of ditto.

Similar letters of reference indicate corresponding parts in the two figures.

This invention consists in a peculiar arrangement of pipes, air vessel and a suction and force chamber, arranged relatively with each other as hereinafter shown, so that a very portable and efficient pump is obtained, and one that is especially applicable to watering gardens, syringing plants, washing windows and like purposes.

To enable those skilled in the art to fully understand and construct our invention we will proceed to describe it.

A, represents a cast metal tube or pipe within which a tube B, is placed longitudinally. To the outer end of the tube or pipe A, a nozzle C, is attached and this nozzle communicates directly with the internal tube B, the outer ends of the two tubes A, B, being connected as shown at $a$, so as to close the outer end of tube A, as clearly shown in Fig. 1. The tube B, is considerably smaller in diameter than the pipe A, so as to allow a space or chamber D, between them.

The inner end of the pipe A, screws into a socket $b$, which communicates with a semi-spherical shaped chamber E, having a pipe F, projecting from it in line, or in the same plane as the pipe A. The outer end of the pipe F, has a nozzle G, secured upon it, said nozzle being connected to a cap H, which secures a valve I, to the end of the pipe F, said valve being formed of an elastic strip $c$, which fits over an annular opening in the cap H.

Over the outer side of the semi-spherical chamber E, an elastic cover $d$, is secured by means of a metal rim J, which screws on the chamber E. The cover $d$, may be of india rubber or any flexible or elastic substance, and a metal clamp K, is attached to the center of the cover, said clamp being formed of two circular disks $a^x$, $a^x$, one at each side of the cover and connected by a screw bolt $e$, the outer end of which is connected by a pivot $f$, to a lever L, one end of which is connected to the pipe F, by a fulcrum pin $g$.

The tube B, is not quite as long as the pipe A, a space being allowed between the ends of the two tubes so that a valve $h$, may be fitted between the pipe A, and socket $b$.

The pump is used as follows:—By screwing a cap M, on the nozzle G, and inserting the pipe F, in a vessel of water, the lever L, being operated back and forth and the cover $d$, consequently moved in and out, the water will be sucked into the chamber and forced through the tube B, which is of course the eduction pipe, and as the space or chamber D, communicates with the chamber E, said chamber D, will form an air vessel and a continuous stream will be forced through the tube B. In case however the implement is to be used as a syringe, the cap M, is removed from the nozzle G, on pipe F, and secured on the nozzle C. The nozzle G, is then inserted in the water and the chamber E, filled by drawing outward the cover $d$, and ejected from said chamber through pipe F, by forcing the cover $d$, inward, the water in the latter case being drawn into the chamber E, and ejected therefrom through the same pipe F.

We do not claim an elastic cover $d$, placed over a chamber E, in order to form a pump, for such device has been previously used, and pumps thus constructed are generally known as bellows pumps, nor do we claim any of the parts separately; but

Having thus described our invention what we claim as new and desire to secure by Letters Patent, is,

The pipes A, F, B, and the chamber E, provided with the flexible cover $d$, and lever L, or their equivalents and the cap M, the parts being constructed and arranged relatively with each other so as to operate as and for the purpose specified.

WM. DOUGLAS.
BENJM. DOUGLAS.

Witnesses:
Jos. K. F. MANSFIELD, 2d,
JOHN M. DOUGLAS.